J. R. MOFFITT.
Thrashing Machine.
No. 9,432.
Patented Nov. 30, 1852.
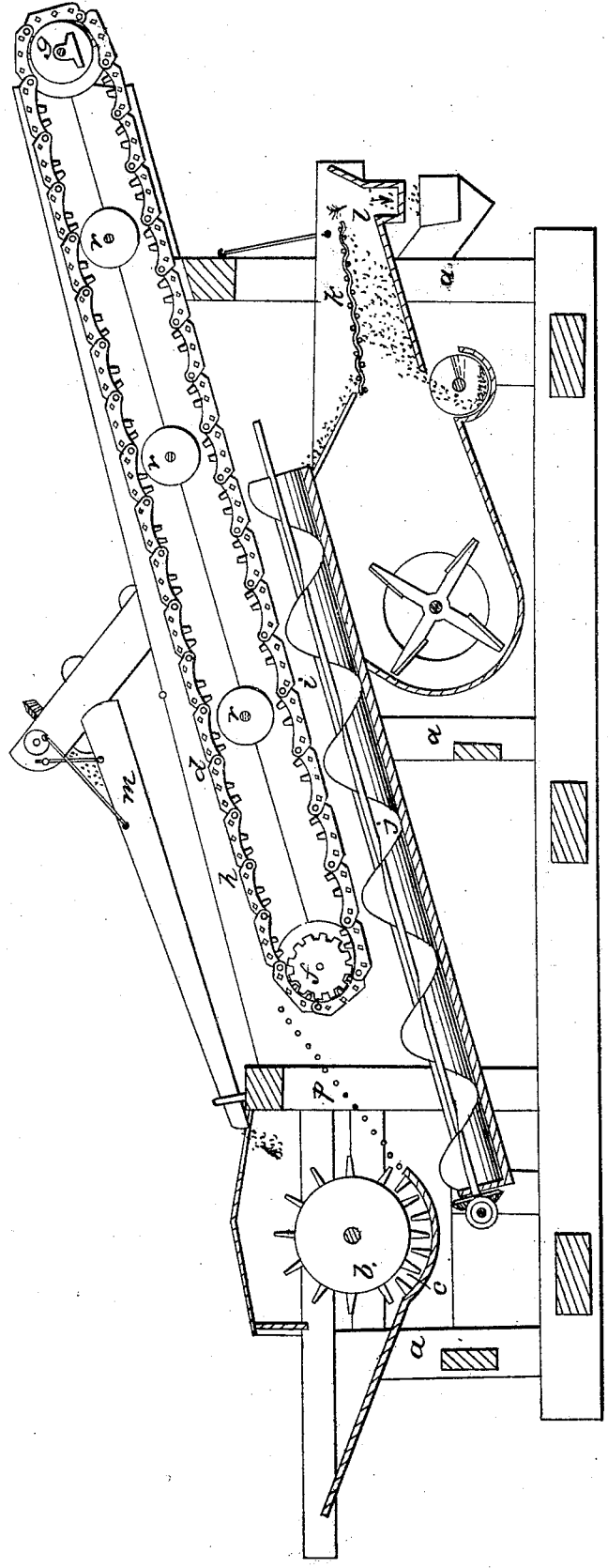

UNITED STATES PATENT OFFICE.

JOHN R. MOFFITT, OF PIQUA, OHIO.

ENDLESS BELT TO THRESHING-MACHINES.

Specification forming part of Letters Patent No. 9,432, dated November 30, 1852; Reissued March 23, 1858, No. 540.

*To all whom it may concern:*

Be it known that I, JOHN R. MOFFITT, of Piqua, in the county of Miami and State of Ohio, have invented new and useful Improvements in Machinery for Threshing and Separating Grain; and I do hereby declare the following to be a full, clear, and exact description of the nature, construction, and operation thereof, reference being had to the annexed drawing, making part of this specification.

The prominent points of improvement in this invention consist in devices for the prompt and thorough separation of the grain from the straw, which in the usual machinery for this purpose is liable to carry off and waste a portion of the grain.

In the annexed longitudinal section of a machine embodying my improvements, ($a$) are different portions of the framework of the machine, ($b$) is an armed threshing cylinder, and ($c$) its drum of usual construction.

($d$) is a continuous revolving apron for carrying off the straw away from the grain, the major part of which falls through the grating ($p$) for conveyance to the winnowing mill, as hereinafter described. This apron has two metallic belts composed of links ($e$) of cast iron and curved concavely on their inner edge to fit the wheels ($f$) which drive the belts and the wheels ($g$) which stretch them. Slats ($h$) connect the opposite links of the two belts, the said slats being firmly wedged in mortises in the links by keys driven into their ends after insertion. The links are provided with teeth ($s$) enough to enable the cog wheels ($f$) to revolve the apron by their means. Placed at intervals beneath the belts are rollers ($r$) which serve not only to support the belt, but by the collision of the curved and toothed links with their upper sides an intermittent jerking motion is imparted to the apron which keeps the straw loose and effectually shakes from it all of the grain which has been entangled among it. In order that the slots may oppose as little as possible the descent of the grain they are made square and presented angle uppermost, and on the same account the narrow iron chain or belt above described is preferable to the usual leather bands. The iron belt is also more durable and is especially desirable on account of its applicability to impart the jerking motion before described. The grain and small chaff thus separated from the straw drops onto the sloping sides of troughs ($i$), at the bottom of which revolve conveyers ($j$), which, as fast as the grain falls, move it forward and upward and deposit it upon the riddle ($k$) of the winnowing apparatus, through which the hulled grain, cheat, &c., pass, and are separated in the usual way, while the heads or unhulled grain passing forward along the riddle ($k$), drops therefrom into the trough ($l$), whence they are removed by a conveyer into a shoe ($m$), which returns them to the beater of the threshing apparatus, around two thirds of whose circumference having passed and being mostly rid of their hulls are thereby enabled to pass through the winnowing apparatus, but any which pass a second time unhulled are sure to be introduced again to the threshing machinery.

Having thus described the nature of my improvements in machinery for threshing and separating grain, I wish it to be understood that I lay no claim to originality in passing the screenings a second time through the threshing apparatus, as that has already been done. Neither do I claim the use of a continuous apron with open slats or interstices for carrying off the straw, but

What I claim herein as new and desire to secure by Letters Patent is—

The continuous open apron having its belt formed of links, whose cogs are at one part of their rotation (in connection with the pinions) a means of propulsion, and are at another part of their rotation (in connection with the rollers or other stationary objects) a means of agitation of the said apron.

In testimony whereof, I have hereunto set my hand before two subscribing witnesses.

JOHN R. MOFFITT.

Witnesses:
 GEO. H. KNIGHT,
 E. H. PUGH.

[FIRST PRINTED 1912.]